(12) United States Patent
Saleh

(10) Patent No.: US 11,525,436 B2
(45) Date of Patent: Dec. 13, 2022

(54) WIND TURBINE

(71) Applicant: Siemens Gamesa Renewable Energy Innovation & Technology S.L., Sarriguren (ES)

(72) Inventor: Ahmad Saleh, Orlando, FL (US)

(73) Assignee: SIEMENS GAMESA RENEWABLE ENERGY INNOVATION & TECHNOLOGY S.L

( * ) Notice: Subject to any disclaimer, the term of this patent is extended or adjusted under 35 U.S.C. 154(b) by 0 days.

(21) Appl. No.: 17/195,879

(22) Filed: Mar. 9, 2021

(65) Prior Publication Data

US 2021/0285425 A1 Sep. 16, 2021

(30) Foreign Application Priority Data

Mar. 12, 2020 (EP) ..................... 20382184

(51) Int. Cl.
*F03D 80/60* (2016.01)
*F03D 15/00* (2016.01)
*F03D 80/70* (2016.01)

(52) U.S. Cl.
CPC ............ *F03D 80/60* (2016.05); *F03D 15/00* (2016.05); *F03D 80/70* (2016.05); *F05B 2260/232* (2013.01)

(58) Field of Classification Search
CPC . F03D 9/25; F03D 15/00; F03D 80/60; F03D 80/70; F05B 2260/232; F16H 57/0412–0419
See application file for complete search history.

(56) References Cited

U.S. PATENT DOCUMENTS 8,047,774 B2 * 11/2011 Bagepalli ................. H02K 9/19
310/58
2019/0226461 A1 * 7/2019 Waddell .................... F03D 9/25

FOREIGN PATENT DOCUMENTS

| CN | 209855975 U | 12/2019 |
| EP | 2375210 A1 | 10/2011 |
| WO | 2021251957 A1 | 12/2021 |

OTHER PUBLICATIONS

Machine translation of EP 2375210 A1 (reference in IDS) (Year: 2011).*

(Continued)

*Primary Examiner* — Christopher Verdier
*Assistant Examiner* — Maxime M Adjagbe
(74) *Attorney, Agent, or Firm* — Schmeiser, Olsen & Watts LLP

(57) ABSTRACT

A wind turbine, including a main gear box, which is lubricated and/or cooled by oil, and a thermosiphon cooling system for cooling the oil is provided. The thermosiphon cooling system solves the main challenges facing the oil cooling systems in wind turbines. The high efficiency of the evaporation heat transfer mechanism gives the capacity to transfer the required heat load in relatively smaller size system. In this way, installation space is reduced. The thermosiphon cooling system has no service requirements over the lifetime of the wind turbine since the thermosiphon cooling system has no moving parts. Costs are saved since the simplicity of the thermosiphon cooling system adds a big value to the system business case.

8 Claims, 3 Drawing Sheets

(56) References Cited

OTHER PUBLICATIONS

Eaton Corporation: "Lubrication and Filter Systems for Wind Power Gears Twinfil Filter System Internormen Product Line", , Jan. 1, 2012 (Jan. 1, 2012), XP055724335, Retrieved from the Internet: URL:https://www.eaton.com/ecm/groups/public/(g)pub/(g)filtration/documents/content/pct_305301.pdf [retrieved on Aug. 21, 2020];.
European Search Report dated Aug. 31, 2020 for application No. 20382184.8.

* cited by examiner

WIND TURBINE

CROSS-REFERENCE TO RELATED APPLICATIONS

This application claims priority to EP Application No. 20382184.8, having a filing date of Mar. 12, 2020, the entire contents of which are hereby incorporated by reference.

FIELD OF TECHNOLOGY

The following relates to a wind turbine.

BACKGROUND

A wind turbine has a nacelle, a hub being rotatable supported at the nacelle, a generator being provided inside the nacelle and a main gear box that is arranged between the hub and the generator. The main gear box is lubricated and cooled by means of oil. During operation of the wind turbine, the oil needs to be cooled. Up to the applicant's internal knowledge, in the wind industry there are two main cooling methods used for oil cooling.

In a so-called active oil to air system, the oil heat is extracted in an oil/air heat exchanger by driving air into a cooler by electrical or mechanical ventilators. In a so-called oil/coolant/air system, the coolant that is driven by a pump extracts the heat from the oil in an oil/coolant heat exchanger. Then the coolant circulates into an air/coolant heat exchanger where it can be passively cooled by using the wind stream or actively by using a ventilator to drive the air.

SUMMARY

An aspect relates to provide an improved wind turbine.

Accordingly, a wind turbine, comprising a main gear box, which is lubricated and/or cooled by means of oil, and a thermosiphon cooling system for cooling the oil is provided.

The thermosiphon cooling system solves the main challenges facing the oil cooling systems in wind turbines. The high efficiency of the evaporation heat transfer mechanism gives the capacity to transfer the required heat load in relatively smaller size system. In this way, installation space can be reduced. The thermosiphon cooling system has no service requirements over the lifetime of the wind turbine since the thermosiphon cooling system has no moving parts. Costs can be saved since the simplicity of the thermosiphon cooling system adds a big value to the system business case.

A "thermosiphon cooling system" in this context has to be understood as a passive heat exchange system, based on natural convection, which circulates a fluid, in particular a working fluid, without the necessity of a mechanical or electrical pump. In other words, the thermosiphon cooling system is a passive cooling system and therefore has no moving parts. Hence, the thermosiphon cooling system is pump-less or pump-free. "Pump-less" or "pump-free" means that the thermosiphon cooling system has no pump to circulate the working fluid.

The wind turbine comprises a nacelle that receives the main gear box. A hub is rotatable supported at the nacelle. Inside the nacelle, a generator can be provided. The main gear box can be arranged between the hub and the generator. The hub supports a plurality of rotor blades. There can be provided two or three rotor blades. The nacelle can be box-shaped.

According to an embodiment, the thermosiphon cooling system forms a closed loop.

A "closed loop" or "closed circuit" in this context means that the working fluid that circulates in the thermosiphon cooling system cannot leave the thermosiphon cooling system.

According to a further embodiment, the thermosiphon cooling system comprises an evaporator, a condenser and pipes that couple the evaporator to the condenser in such a way that the thermosiphon cooling system forms the closed loop.

There are provided two pipes. A liquid pipe is capable of transporting liquid working fluid from the condenser to the evaporator. A gaseous or vapor pipe is capable of transporting gaseous working fluid from the evaporator to the condenser. The pipes are corrugated metal hoses or tubes to absorb the vibrations of the working wind turbine and during a transportation process to optimize the packaging and shipping handling. All connections between the pipes, the evaporator and the condenser are brazed to eliminate the risk of leakage during the lifetime of the thermosiphon cooling system.

According to a further embodiment, the condenser is arranged above the evaporator when viewed along a height direction.

In this way, gravity forces the condensed working fluid from the condenser back to the evaporator.

According to a further embodiment, the wind turbine further comprises a nacelle that receives the main gear box, wherein the evaporator is arranged inside the nacelle, and wherein the condenser is arranged outside the nacelle.

The evaporator is arranged at a side wall of the nacelle. There can be provided more than one evaporator and/or more than one condenser.

According to a further embodiment, the condenser is arranged on top of the nacelle.

In particular, the condenser is arranged on or at a ceiling or roof of the nacelle. A holder can be provided for holding the condenser.

According to a further embodiment, the condenser is tilted in a tilting angle toward a horizontal.

In this way, the condensed working fluid collects at a lowest point of the collector from where it is guided to the evaporator by means of one of the afore-mentioned pipes.

According to a further embodiment, the wind turbine further comprises a fan that forces air through the condenser.

The fan is optional. The fan can be a ventilator. There can be provided more than one fan. The fan increases the amount of heat that can be taken away from the condenser.

According to a further embodiment, the main gear box is coupled to the evaporator by means of hoses or pipes.

The hot oil is guided from the main gear box through one of the pipes to the evaporator. In the evaporator, heat is transferred from the oil to the working fluid which then evaporates and flows to the condenser. The cooled oil leaves the evaporator and is guided back to the main gear box through another one of the pipes. A pump can be provided for circulating the oil. The pump is optional. The main gear box itself can circulate the oil. A "hose" is a flexible hollow tube designed to carry fluids from one location to another. A "pipe" in this context in an inflexible hollow tube designed to carry fluids from one location to another.

According to a further embodiment, the wind turbine further comprises a working fluid, in particular a refrigerant, that circulates in the thermosiphon cooling system.

A "refrigerant" in this context is a substance or mixture, usually a fluid, used in a heat pump and refrigeration cycle. In most cycles, it undergoes phase transitions from a liquid to a gas and back again. For example, 1,1,1,2-Tetrafluoroethane (R-134a) can be used as working fluid. The working fluid can also be water, for example.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

In the Figures, like reference numerals designate like or functionally equivalent elements, unless otherwise indicated.

DETAILED DESCRIPTION

Figure 1:
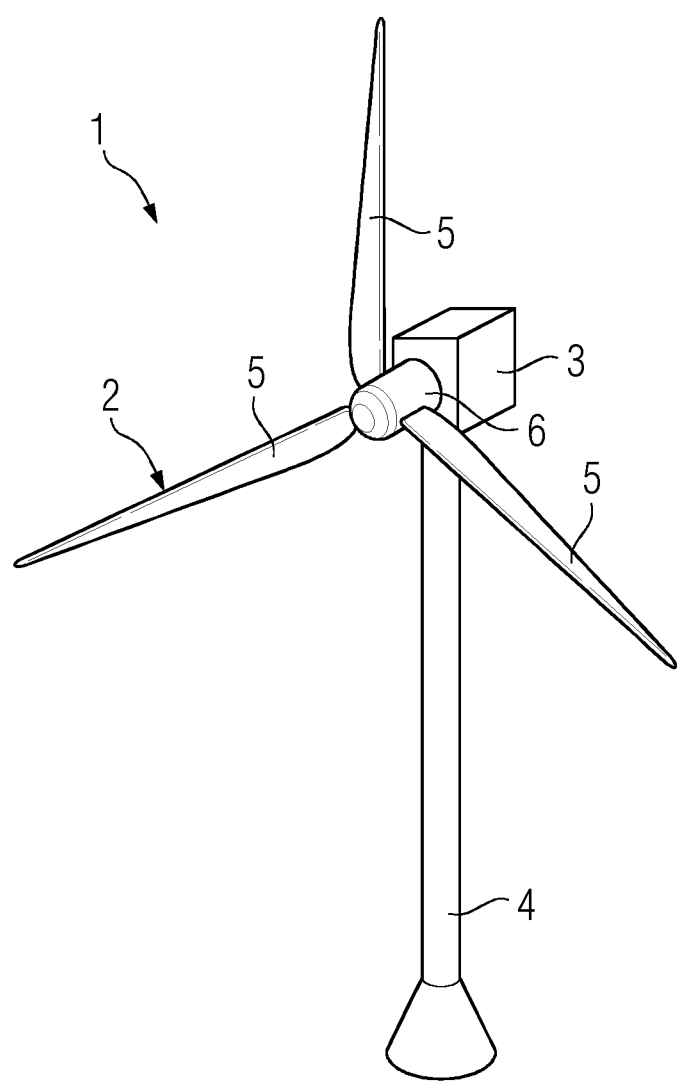
FIG. 1 shows a perspective view of a wind turbine according to one embodiment.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1. The tower 4 has a plurality of tower sections that are arranged on top of each other. The tower 4 can be named wind turbine tower.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally desired over carbon fibers for cost reasons. Oftentimes, glass fibers in the form of unidirectional fiber mats are used.

Figure 2:
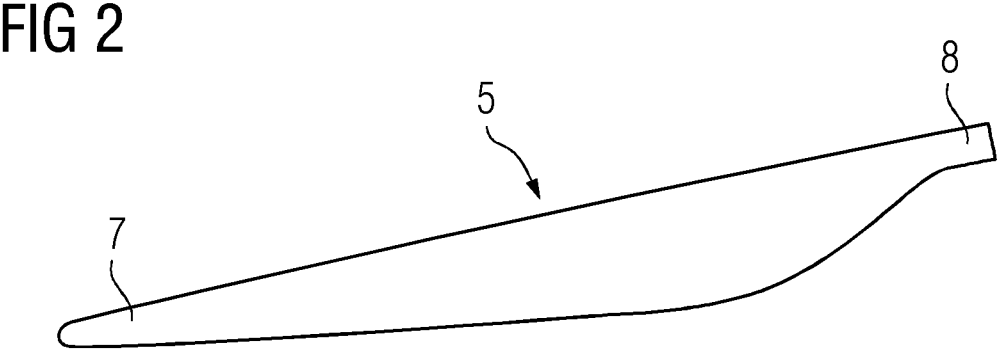
FIG. 2 shows a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

Figure 3:
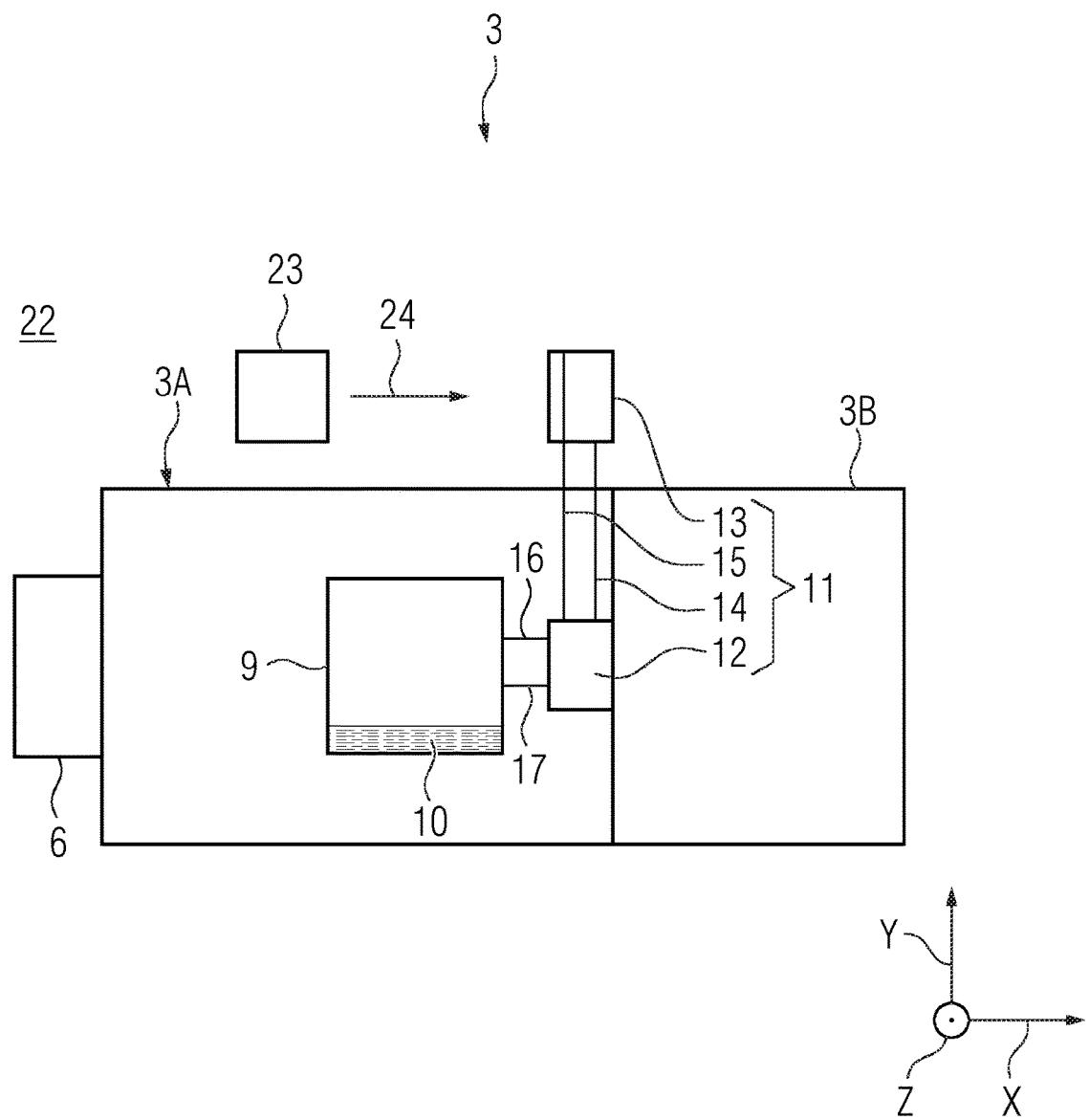
FIG. 3 shows a side view of a nacelle according to one embodiment.
Figure 4:
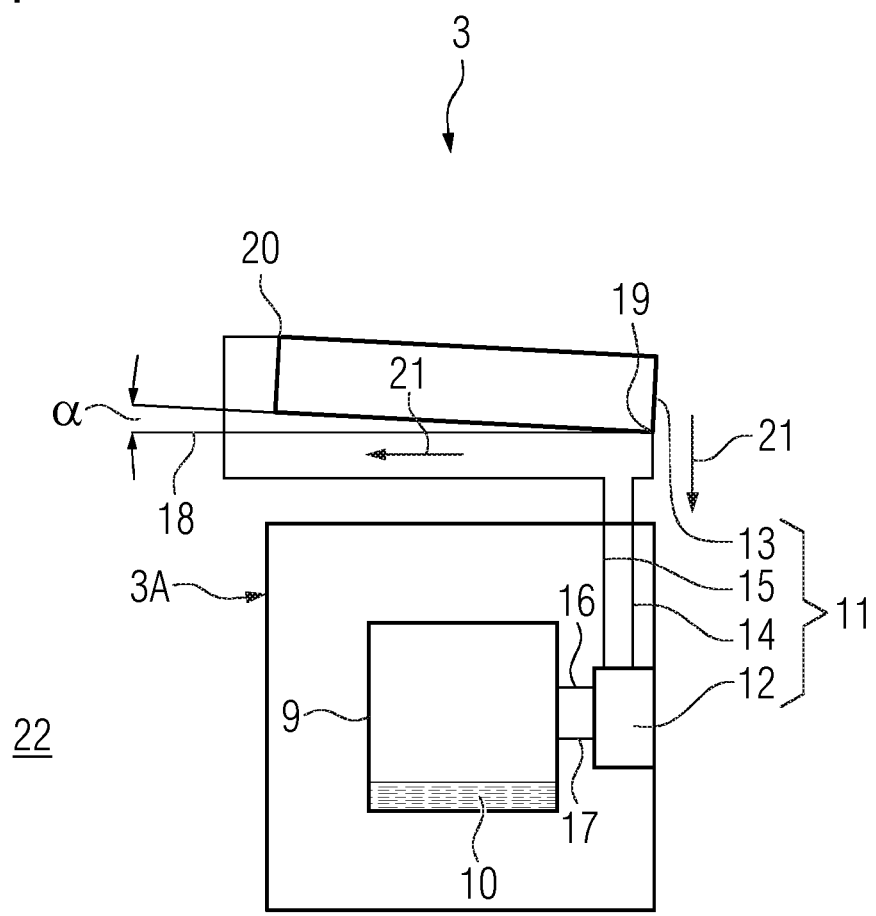
FIG. 4 shows a back view of the nacelle according to FIG. 3.
Figure 4:
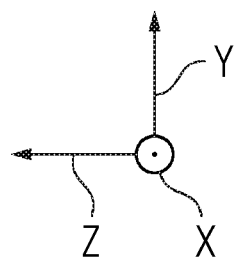

FIGS. 3 and 4 show a nacelle 3 according to one embodiment.

The nacelle 3 has a coordinate system that comprises an x-direction or depth direction x, a y-direction or height direction y and a z-direction or width direction z. The nacelle 3 has a front part 3A and a rear part 3B. The rear part 3B is not shown in FIG. 4.

The nacelle 3 encompasses a main gear box 9. The main gear box 9 can be arranged between the hub 6 and the generator (not shown). The main gear box 9 is arranged inside the front part 3A of the nacelle 3, whereas the generator is arranged inside the rear part of the nacelle 3.

The main gear box 9 is lubricated and cooled by means of oil 10. During operation of the wind turbine 1, the oil 10 has to be cooled.

For cooling the oil 10, a thermosiphon cooling system 11 is provided. A "thermosiphon cooling system" in this context has to be understood as a passive heat exchange system, based on natural convection, which circulates a fluid without the necessity of a mechanical pump. In other words, the thermosiphon cooling system 11 is a passive cooling system and therefore has no moving parts.

The thermosiphon cooling system 11 comprises an evaporator 12 that is arranged within the nacelle 3, in particular within the front part 3A. The evaporator 12 is connected to a condenser 13 by means of pipes 14, 15. The evaporator 12 is connected to the main gear box 9 or to an oil sump of the main gear box 9 by means of pipes 16, 17. The condenser 13 is arranged outside the nacelle 3. The condenser 13 is arranged on top, in particular on a roof, of the nacelle 3, in particular of the front part 3A. The condenser 13 can be mounted anywhere on the nacelle 3, as long as enough vertical distance to create the required gravitational force to maintain the required liquid flow back to the evaporator 12 is maintained. When seen along the height direction y, the condenser 13 is arranged above the evaporator 12. In other words, when seen along the height direction y, the evaporator 12 is arranged below the condenser 13.

The condenser 13 is tilted toward a horizontal 18. The horizontal 18 is arranged parallel to the width direction z. The condenser 13 is arranged in a tilting angle α toward the horizontal 18. The tilting angle α can have a value of 1 to 15°. The pipe 14 is connected to a lowest point 19 of the condenser 13. The pipe 15 is connected to a highest row 20 of the condenser 13.

The pipes 14, 15 are corrugated metal hoses. The pipe 14 is capable of transporting a liquid phase of a working fluid 21 from the condenser 13 to the evaporator 12. For this reason, the pipe 14 can be named liquid pipe. The working fluid 21 can be a refrigerant. A "refrigerant" in this context is a substance or mixture, usually a fluid, used in a heat pump and refrigeration cycle. In most cycles, it undergoes phase transitions from a liquid to a gas and back again. For example, 1,1,1,2-Tetrafluoroethane (R-134a) can be used as working fluid 21.

The pipe 15 is capable of transporting a gaseous phase of the working fluid 21 from the evaporator 12 to the condenser 13. For this reason, the pipe 15 can be named gaseous pipe. All connections between the pipes 14, 15, the evaporator 12 and the condenser 13 are brazed to eliminate the risk of leakage during the lifetime of the thermosiphon cooling system 11.

The function of the thermosiphon cooling system 11 is as follows. The oil 10 is circulated from the main gear box 9 through the pipes 16, 17 to the evaporator 12 and back. The pipe 16 guides the hot oil 10 from the main gear box 9 to the evaporator 12. The pipe 17 guides the cooled oil 10 from the evaporator 12 back to the main gear box 9. For circulating the oil 10, an optional pump (not shown) can be provided.

In the evaporator 12, heat is transferred from the oil 10 to the working fluid 21. The working fluid 21 evaporates and is guided through the pipe 15 to the condenser 13. The gaseous working fluid 21 condenses in the condenser 13 while transferring heat to a surrounding 22 of the nacelle 3. The condenser 13 is cooled by means of air in the surrounding 22 taking up the heat. In this way, the heat extracted by the working fluid 21 is cooled passively by the air. Optionally, there can be provided a fan 23 that forces air 24 through the condenser 13. The fan 23 can be mounted in front of the condenser 13 to push the air 24 through the condenser 13. The fan 23 can also be mounted behind the condenser 13 to pull the air 24 through the condenser 13.

After condensing, the working fluid 21 is guided back to the evaporator 12 by means of the pipe 14. Due to the fact that the condenser 13 is tilted and the pipe 14 is connected to the lowest point 19 of the condenser 13, a backing of the liquid working fluid 21 in the condenser 13 can be prevented. The working fluid 21 that is guided back to the evaporator 12 is then again evaporated in the evaporator 12 and guided back to the condenser 13. In this way, a closed loop of the working fluid 21 can be provided.

As mentioned before, a refrigerant can be used as working fluid 21. However, different fluids can be used depending on the system pressure and working temperature range required. The thermosiphon cooling system 11 is complete passive, meaning it eliminates the need for a pump or fan. The working fluid 21 circulates between the evaporator 12 and the condenser 13 by the forces generated by pressure difference between condenser 13 and evaporator 12. The design considered having the condenser 13 vertically mounted above the evaporator 12 to use the gravity force in the favor of circulating the condensed working fluid 21 back to the evaporator 12. In addition, the condenser 13 is tilted in the tilting angle α to force the condensed working fluid 21 through the pipe 14 back to the evaporator 12.

The evaporator 12 is mounted inside the nacelle 3. Hence, the design eliminates the risk of any oil leakage into the surrounding 22. The thermosiphon cooling system 11 is designed to be assembled, sealed and charged by the supplier prior to shipment to the site, to eliminate the cost of assembling in production and to save in the logistics and shipping. The thermosiphon cooling system 11 is designed to allow for a simple installation process as a complete assembled unit. This mitigates the risk of installation errors during assembling and filling process that is required in current solutions.

The thermosiphon cooling system 11 solves the main challenges facing the oil cooling systems in wind turbines 1. The high efficiency of the evaporation heat transfer mechanism gives the capacity to transfer the required heat load in relatively smaller size system. In this way, installation space can be reduced.

The thermosiphon cooling system 11 has no service requirements over the lifetime of the wind turbine 1 since the thermosiphon cooling system 11 comes sealed and brazed and has no moving parts. Costs can be saved since the simplicity of the thermosiphon cooling system 11 adds a big value to the system business case. About 30% reduction in initial costs can be achieved. Over 35% savings in total costs including lifetime running cost of the wind turbine 1 are achievable.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine, comprising a main gear box, which is lubricated and/or cooled by oil, and a thermosiphon cooling system for cooling the oil, wherein the thermosiphon cooling system forms a closed loop, wherein the thermosiphon cooling system comprises an evaporator, a condenser, and pipes that couple the evaporator to the condenser such that the thermosiphon cooling system forms the closed loop, and wherein the main gear box is coupled to the evaporator by hoses and/or pipes configured to circulate oil between the main gear box and the evaporator.

2. The wind turbine according to claim 1, wherein the condenser is arranged above the evaporator when viewed along a height direction.

3. The wind turbine according to claim 1, further comprising a nacelle that receives the main gear box, wherein the evaporator is arranged inside the nacelle, and wherein the condenser is arranged outside the nacelle.

4. The wind turbine according to claim 3, wherein the condenser is arranged on top of the nacelle.

5. The wind turbine according to claim 1, wherein the condenser is tilted in a tilting angle toward a horizontal.

6. The wind turbine according to claim 1, further comprising a fan that forces air through the condenser.

7. The wind turbine according to claim 1, further comprising a working fluid that circulates in the thermosiphon cooling system.

8. The wind turbine according claim 7, wherein the working fluid is a refrigerant.

* * * * *